Figure 1:
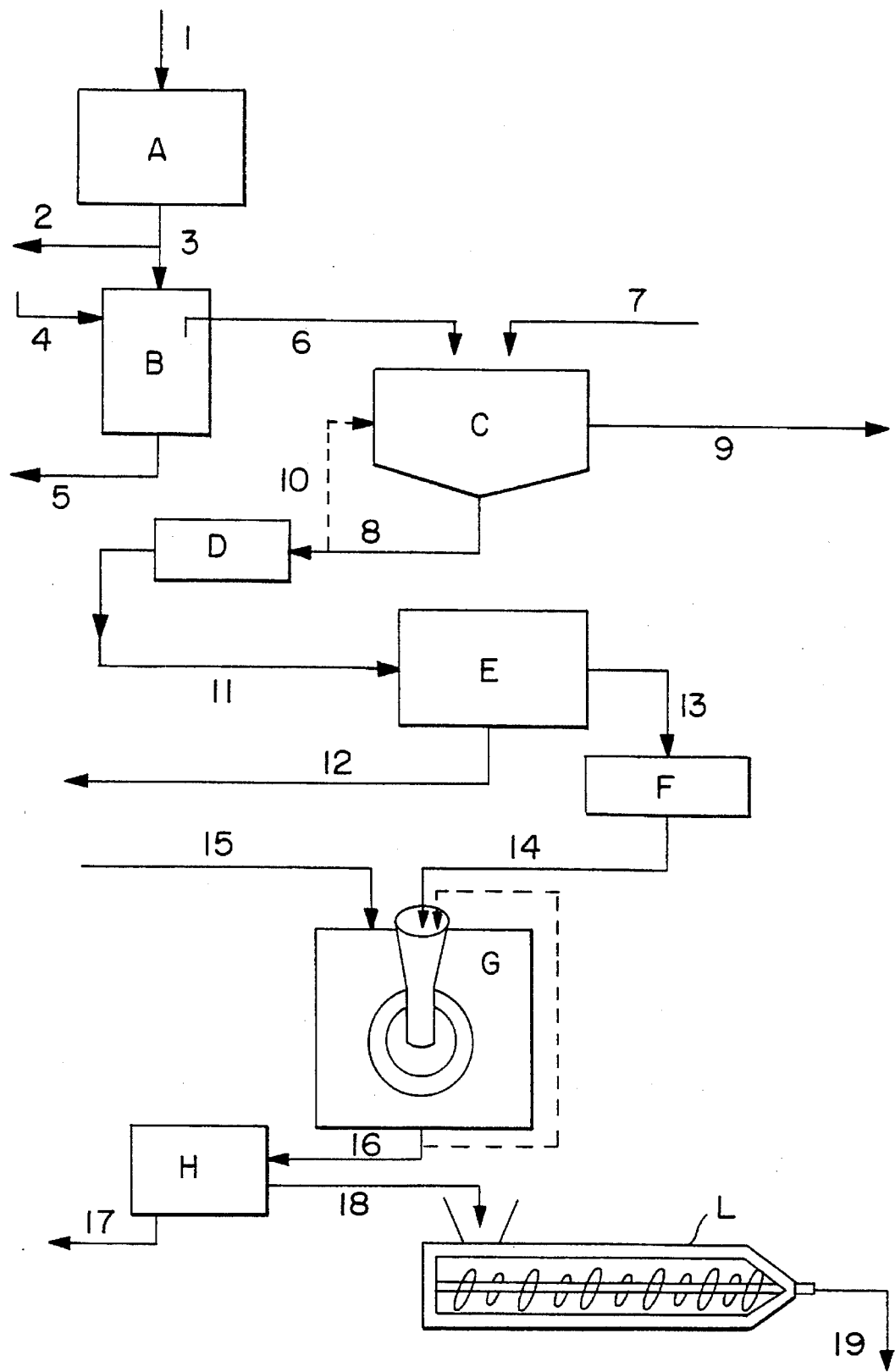

United States Patent [19]
Preiss

[11] Patent Number: 5,566,889
[45] Date of Patent: Oct. 22, 1996

[54] PROCESS FOR PRODUCTION OF RECYCLED PLASTIC PRODUCTS

[75] Inventor: Joachim Preiss, Goldkronach, Germany

[73] Assignee: Montell North America Inc., Wilmington, Del.

[21] Appl. No.: 64,620

[22] Filed: May 20, 1993

[30] Foreign Application Priority Data

May 22, 1992 [DE] Germany ............... 42 17 005.2

[51] Int. Cl.⁶ ............... B02C 19/12; B02C 23/08
[52] U.S. Cl. ............... 241/19; 241/20; 241/24.28; 241/29; 241/DIG. 38
[58] Field of Search ............... 241/20, 24, 29, 241/DIG. 38, 19, 24.28

[56] References Cited

U.S. PATENT DOCUMENTS

| | | | |
|---|---|---|---|
| 4,809,854 | 3/1989 | Tomaszek | 209/3 |
| 4,830,188 | 5/1989 | Hannigan et al. | 209/3 |
| 4,981,876 | 1/1991 | Grimmer | 521/46.5 |
| 5,011,087 | 4/1991 | Richardson et al. | 241/5 |
| 5,183,212 | 2/1993 | Boo et al. | 241/17 |
| 5,297,741 | 3/1994 | Zurn et al. | 241/14 |
| 5,323,971 | 6/1994 | Nishibori et al. | 241/3 |

FOREIGN PATENT DOCUMENTS

| | | | |
|---|---|---|---|
| 542593 | 6/1993 | European Pat. Off. | |
| 3002061 | 7/1981 | Germany | 241/20 |
| 3535633 | 4/1987 | Germany | 241/24 |

OTHER PUBLICATIONS

"Wiederverwertung von lackierten PP–EPDM–Stossfängern", pp. 48–52, written by Bruno Rapp, in *Plastverarbeiter*, 42, 1991.
Modern Plastics International, 23, No. 2, p. 13–14 (Feb. 1993), Lausanne, Switzerland article.

Primary Examiner—John M. Husar

[57] ABSTRACT

Disclosed is a process for the production of a recycled plastic product from varnished plastic parts by multistagedly grinding but not pulverizing while at the same time subjecting same to a stretching treatment during the pulverizing step to loosen substantially completely all of the varnish sticking thereto. The resulting plastic and varnish particles are separated and thereafter packaged, typically, in the form of granulate. The resulting thermoplastic plastic recycled material does not contain any visible inclusions of more than 0.25 mm² of varnished particles in the sheet test.

17 Claims, 1 Drawing Sheet

PROCESS FOR PRODUCTION OF RECYCLED PLASTIC PRODUCTS

The present invention relates to a method for recycling used varnished plastic parts, particularly automotive parts.

Plastic parts for automotive applications can be produced from a variety of different polymers. Frequently, however, binary or tenary thermoplastic molding materials or compounds are used, preferably based on polypropylene or, in much fewer cases, however, based on polyethylene. Among possible applications of such molding materials are inter aliae linings for wheel housings, trunk linings, accumulator cases, battery covers, side panels, bumpers etc. In practice several different methods are known to produce recycled materials from form parts, which consist to a significant degree of thermoplastic molding materials.

A known method for example relates to the recycling of varnished bumpers. Bumpers consist essentially of elastomer modified polypropylene, being modified with a rubber component, e.g. an elastomeric copolymer of ethylene and propylene (EPM) and/or an elastomeric terpolymer of ethylene, propylene, and a non-conjugated diene (EPDM). Additionally, a lot of additives can be added to impart certain properties to the binary or ternary molding material.

In a known recycling method unvarnished used bumpers are disassembled in a first step, then milled or shredded inclusively all foreign parts like lamps, mountings, beams etc., resulting in chips the size of palms. These pieces are then wet milled under high pressure resulting in a clean fine ground stock or milled material. The fine ground stock is homogenized and will be stabilized after an analysis according to the intended application by additives and is finally mixed in the relation of 1:5 until 1:6 with e.g. ground stock coming from accumulator cases consisting of polypropylene copolymer. According to its properties the resulting recycled material can not be used to produce new bumpers, particularly because of a lack of impact strength at low temperatures as well as a lack of impact strength as well at room temperature as also at lower temperatures. The recycled material can be used, however, for lower value applications, e.g. for linings for wheel housings. For this application the low impact strength is even a desired feature. There remains a problem, however, concerning the look and the unpleasant small of the recycled material, the latter probably being caused particularly by the sulphur content coming from the accumulate a ground stock.

The recycling of varnished plastic parts is particularly difficult, e.g. of varnished bumpers. Many molded parts will be coated with a varnish based on polyurethane or acrylate, either for optical reasons or to protect them. To provide a sufficient bond between the varnish and the often non-polar surface the plastic parts have to be pretreated, e.g. with a primer, by flame chipping, etching or the like. As far as molded parts are concerned flame chipping is the most used method. Partly a linkage can be provided—also using special methods normally rarely applied, like plasma- or corona treatment—comprising a bond between varnish layer and molded part, which resists all normal and available solution means as well as blast cleaning or flame treatments.

In general recycled materials made of varnished plastic parts with a relatively high content of varnish rests are worse in all important properties compared to recycled materials made of non-varnish plastic parts. For example bumpers being recycled using a method like the one described for unvarnish molded parts provide recycled materials and in turn molded parts therefrom having surface faults, being disadvantageous particularly during a new varnishing procedure. Furthermore they show a drop in tensile strength as well as a drop in impact strength or impact strength at low temperatures, having therefore only properties not matching current demands.

It has been tried (Plastverarbeiter, 42, pages 48 and following, 1991) to reclaim a recycled material having acceptable mechanical properties also at lower temperatures from varnish bumpers using a multiple step grinding process. For this purpose in tests production waste of varnish bumpers was ground in a first grinding step to a ground stock the grain of which having a size between 6 and 12 mm. The coarse ground stock is ground in a second step in a micro eddy mill to a stock the grain of which having a size between 300 and 500 μm. Although the mechanical properties of fine size ground stock is much better compared to coarse ground stock of varnish bumpers, the deteriotion force, the deformation and the work in an electronic puncture according to DIN 53 443/2 at a temperature of −30° C. have a clear tendency to lesser values. The fine ground stock consists either of freely coexisting very fine varnish and plastic particles and/or of fine plastic particles carrying varnish rests. It is only by adding a suitable bonding agent in a sufficient amount of approximately 1% to the fine ground stock to bond the freely floating varnish particles within the recycled plastic material that also the described properties can be raised approximately to the level of the properties of coarse ground stock made of unvarnished bumpers. It remains, however, a considerable drop of properties, so that in general without further step to eliminate the varnish content the recycled material can be used only for applications of lesser values.

In order to improve the quality further it has been proposed to extrude and degas the varnish ground stock after the fine grinding step and to sieve the molten polypropylene, as well as to granulate the thermoplastic molding material in order to reclaim the stock screened out. In order to screen the molten mass the molten fine ground stock is forced through a panel comprising orifices or a screen pack during the extrusion process. Because of the fine grain of the varnish particle very fine screen packs are required (e.g. 500 μm, 250 μm etc.). To overcome the resulting flow resistance an additional pump for a molten mass is required, what is disadvantageous and increases the costs of the molding and filtration or screening process. Although no current test results are available concerning the screening of the varnish particles out of the molten mass, it is to be expected that for a sufficient varnish elimination and suitable dimensions of such an extruder comprising a screen pack the mass flow should be relatively low so that the high energy required to melt the recycled materials is economically not justified.

It has been furthermore tried to remove the varnish layer sticking on the form parts by using a multiple step grinding process using cooling means. By cooling down the stock to be ground to very low temperatures the propylene becomes brittle causing during further crushing a lower bond of the varnish and finally leading to flaking of the varnish particles. Although this concept results in a relatively high degree of varnish elimination a lot of energy is required for cooling purposes rendering the method uneconomic.

In view of the described problems it is therefore an object of the present invention to create a method to recycle the plastic content in varnished plastic form parts, the inventive method being particularly effective as far as the varnish removal is concerned and that is less complicated and therefore more economic than known methods. Another object of the invention is furthermore to provide a recycled material from varnish plastic products, particularly on the basis of thermoplastic molding materials containing polypropylene, the properties of which being as close as possible to unrecycled material and therefore being suitable for high value applications.

These and further objects are achieved by the method as described herein.

According to the present invention the object is achieved by removing the adherent varnished particles from the varnish form parts in a multiple step disintergrating or milling process, so that finally essentially varnish free recycled plastic products are obtained which in turn can be processed into varnish or unvarnished products without a need to accept a loss of quality.

Plates made of recycled material according to the present invention showed in laboratory tests that it is possible to produce parts showing no loss of quality compared to freshly manufactured goods concerning the varnish bond— particular as far as the climate change test, known to the man skilled in the art, is concerned—as well as concerning mechanical properties.

According to the invention the disintegration of the varnished plastic parts is combined with a strong tensile and sheer stress induced in the particles to be disintegrated in a single step of the process, the tensile and shear treatment inducing extensions and shear forces of such of an amount in the particles and the adherent varnish layers that the varnish layer flakes from the varnish plastic particles. In contrast to methods known in the state of the art the ground stock is not powderized to obtain the desired high degree of varnish flaking, rather according to the invention during the process of fine grinding the relatively coarse particles are deformed or drilled and bent and particularly extended, so that the varnish or lacquer particles adherent on the coarse plastic particles flake or chip off and are scaled off. Due to the size of the flaking varnish particles the size of which being significantly higher than the fine powdersize known from the state of the art the following separation is much easier rendering the recycling process much more efficient and more economic.

The method according to the present invention combines in an advantageous manner a number of method steps, particularly disintegration steps, to produce a recycled plastic product. The generally preshredded varnished form parts made of plastic are disintegrated to coarse particles in a first step in a coarse disintegration or milling step one after another. During the following step of finer grinding the coarse particles then undergo a stretch and shear treatment at the same time with the fine grinding or disintegration so that as a result a significant part of the varnish adherent to the plastic particles chips off. Hereafter the resulting plastic particles will be separated from the chipped varnish particles in a separation step. Particles being separated from the varnish particles are conditioned in a following step so that finally the recycled plastic product essentially free of varnish is obtained. It can be advantageous to carry out additional separation and cleaning steps between the different disintegration steps.

Starting with relatively bulky varnish plastic parts it is advantageous to first break or crush these starting materials for the recycling procedure. It is useful to adjust the varnished plastic particles to an average particle size of 4 to 12 mm. Preferably the size of the form parts is reduced in a first integration step, i.e. breaking or crushing, to the amount of approximately 6 to 8 mm. Also it is possible to have several consecutive milling steps to achieve the desired grain size of the material, for instance due to capacity limitations of the coarse grinding or crushing apparatus being used.

As apparatus for the coarse disintegration of the plastic form parts principally all apparatus known in the state of the art are suitable. It is to be preferred, however, that the plastic parts do not absorb too much of the energy produced in the run of the disintegration procedure to avoid a possible strong heating of the material and an undesired melting. Particularly suitable to carry out the coarse integration step are apparatus' machining the plastic form parts in a cutting manner. Known cutting mills are to be preferred for this step.

The first disintegration step can be carried out in a wet or dry process. For the described reasons to minimize the absorption of energy during the disintegration of the plastic parts it is in general to be preferred, however, to add cooling water during the coarse disintegration or breaking of the varnish plastic parts so that the coarse milling is carried out under wet conditions. The wet coarse milling can be followed by further separation, cleaning or drying operations.

In principal the first coarse disintegration step can be carried out as described. It is preferred, however, to shred the bulky varnished plastic parts together with eventual metallic parts before the coarse disintegration step in a shredder-cutting mill to chips approximately the size of palms. Furthermore these chips preferably undergo are coarse separation step to eliminate the metallic fraction. The coarse separation can be carried out e.g. by means of water in which the metallic parts sink because of their weight whilst the floating plastic parts can be picked up by a conveyor worm.

The result of the coarse disintegration step is a particle like plastic product having a grain size between 4 and 12 mm, whereby the varnish layer is still bonded firmly to the plastic parts.

According to the present invention the coarse particle material together with the adherent varnish undergoes a fine disintegration step with preferably a defibrating character, whereby at the same time considerable deformation and shear forces are induced in the plastic particles. For this purpose the particle material coming from the apparatus of the coarse disintegration step is—preferably after further cleaning, separation and drying steps—conveyed to the disintegration apparatus of the fine disintegration step. In this step the plastic material coming from the first coarse disintegration procedure is fine milled or pulverized so that in a particular useful embodiment a plastic fiber material of a length between 0.5 to 6 mm and a fiber diameter between 0.005 to 0.5 mm is obtained, preferably the length is between 1 and 3 mm and the fiber diameter is approximately 0.1 mm. In general no regular fibers are obtained. The plastic fibers are rather torn fibers having a more irregular form, having, however, preferably a relation of length to diameter of the fibers equal to L/D of approximately 30.

The fine disintegration, i.e. the milling and grinding has to achieve basically three objects. First of all the coarse particles can be further milled down whereby the disintegration is essenally based on tearing of the coarse particles or in a tearing of smaller particles of bigger particles in a milling-like process. In contrast to the first disintegration step an eventual occuring cutting disintegration has only minor importance. According to the present invention, however, the defibrating character of the fine disintegration step is essential. As can be gathered from the sizes of the plastic fibers given above a reduction of the thickness of the material is preferred whereas the length of the particles is reduced much lesser. This is caused by the defibrating character of the milling of the coarse plastic particles— particular globular particles.

In a preferred embodiment of the method according the present invention the described fine disintegration of the coarse plastic particles is effected by passing the coarse particle through a gap formed between a rotating and a fixed milling disc of a milling apparatus, being adapted to produce sufficient shear forces. While passing through the gap the particles are moved in the discharging direction and are deformed thereby, i.e. likewise flexed, whereby the size of the particles discharged from the milling apparatus is defined by the gap distance between the rotating and the fixed milling disc. Particles being too big for the gap are torn apart due to the high occuring forces so that the particles fit through the gap.

According to the invention the coarse particles will be defibrated while passing through a tapering gap between two milling disc profiles. This supports particular advantageously the tearing apart of the plastic particles. The bigger particles will be ripped in a gap portion with a bigger width and will be moved on in the discharging direction. Due to the high forces and due to the gap tapering in the discharging direction the particles will be torn apart but because of the with saw tooth occuring simultaneously before the tearing deformation, which is essentially a stretching of the plastic particles, also the third object of the fine disintegration step is achieved.

The third object of the fine disintegration step is to deform the plastic particles during the defibrating process in a manner that the adherent varnish rests flake. Because of the high elongation at tear of the elastomer modified polypropylene plastic materials (the elongation at tear of plastic materials ranges in general at about several hundred percent) and due to the relatively high difference to the elongation at tear of the varnish particles (the elongation at tear of the normally used cover paints or varnishes ranges at approximately 100–150%, while the elongation at tear of the primer is significantly lesser, so that the figures of the elongation at tear of the varnish material can be rated between 50 and 200%) the varnish particles can follow the elongation of the plastic parts only partly if at all so that they chip off and flake. After the fine disintegration step a mixture of relatively irregular plastic material fibers and varnish chips is therefore obtained.

In case that after the fine disintegration step the necessary fiber size should not be achieved and in case that the content of varnish still adherent on the fibers is too high it can be advantageous to sieve the defibrated material mixture after the first passage through the milling apparatus and to exclude material deviating from the desired size and remill the material in a new defibrating step.

In principal all devices known from the state of the art can be used to mill with a defibrating character, if the apparatus allows this kind of material treatment. Particularly advantageous is the use of mills with an impact effect on the stock to be milled. Among these are the known impact mills or impact crushers, whereby according to the invention particularly the latter are preferred to be used as a milling apparatus for the selective disintegration.

When using this apparatus for the purpose of fine disintegration it is particularly useful to add water to the coarse particles. The polypropylene being comprised in nearly all varnished plastic parts in form of a homopolymer or in form of a copolymer or in form of a mechanical blend has a high energy absorption ability so that melting of plastic can occur during dry milling, because temperatures above the melting point are achieved. In the molten state, however, polypropylene and other molded thermoplastic plastics may be contained having an effect as grease thereby hindering a defibrating disintegration process.

After defibrating and flaking of the plastic particles the mixture of plastic material fibers and the flaked varnished particles are to be conveyed to a further separation stage. The latter works in general according to the principle of differences in weight and/or particle size. In one embodiment according to the invention it is preferred to separate the resulting plastic particles and varnish particles using an air separation in a cyclone.

According to another particular useful modification of the separation step a screening of the mixture is used, e.g. with a vibrating screen. In a further modification according to the present invention it can be advantageous to separate the resulting plastic and varnish particles by using a sink-float-process or a hydro cyclone. Using the water separation advantageously the circumstance can be used that the resulting plastic parts have normally a lower density than water, as the varnish parts generally fillers like for example chalk which are normally significantly heavier than water. Consequently the varnish parts sink and can be drained out in form of mud. The polymer particles floating on the water surface can be collected and conveyed to further processing.

In general the skimmed polymer particles can be further processed and conditioned using one of the known methods. Within the bounds of the invention it is preferred, however, to granulate the separated plastic fibers because the fibers have a very low piled density and because of the relatively big surface a lot of water can adhere. For this purpose advantageously they will be conveyed to an extruder, where adherent water is removed using vacuum and the fibers are granulated thereafter.

The resulting granulate exhibits outstanding recycling properties. It can be used either unblended or as an additive to other forming materials in all further processes of forming material suitable processes. The recycled granulate can be processed for example using all devices' known for plastic processing, like rollers, mixers, extruders, kneading machines etc. It is also very suitable for use in an injection molding process.

With the method according to the present invention all varnished thermoplastic form parts can be usefully processed with a high efficiency to a recycled product, depending on the composition of the used plastic parts. The inventive method is preferably applicable, however, to used varnished form parts consisting essentially of polypropylene and/or polyethylene and/or an elastomeric copolymer of ethylene and propylene (EPM) and/or an elastomeric terpolymer from ethylene, propylene, and a conjugated diene (EPDM) so that a recycled plastic product is obtained that comprises essentially the mentioned materials. In general the inventive method is not disturbed by additives usually contained in the thermoplastic basis material of molding materials or compounds. The inventive method results therefore in a recycled plastic product containing additives like dyes, lubricants, fillers, UV-stabilizers, antioxidant agents, flame proofing agents and/or inorganic fibers according to additives being contained in the used old parts to be recycled.

The recycled plastic materials being recycled according to the inventive method from used form parts, particularly old varnished bumpers, is used in a preferred embodiment for the production of new bumper for automobiles, whereby a content of 20% of recycled material according to the invention normally causes no drop as far as elongation at tear, impact strength and cold impact strength are concerned and whereby simultaneously during an eventual new lacquering or varnishing of the recycled thermoplastic form parts no hindering surface faults occur in the newly produced part. A thermoplastic recycled plastic material used according to the method of the present invention has a elongation at tear of more than 50% up to 100%. A recycled material produced in the described manner has outstanding properties due to the very low content of varnish particles. Therefrom resulting are mentioned positive properties and particularly the very low amount of waste compared to new molding materials.

The thermoplastic recycled plastic material according to the invention is particularly describable by the content of old varnish particles. The smaller the old varnish particles contained in a certain test probe and the fewer they are the better are in general the mentioned critical properties of the recycled material.

The quality of the recycled material is therefore testing using a foil test. For this purpose a determined amount (approximately 0.2 g) of the recycled material to be tested is weighed out using a precision balance. The weighed test quantity is then pressed between two aluminium foils at a temperature of approximately 200° C. for about a minute using a heated precision press having polished plates and being heatable up to approximately 300° C. for about a minute to produce a foil with a thickness of approximately 0.03 up to 0.04 mm and a diameter of approximately 30 mm. Thereafter the foil is cooled down for approximately 30 minutes. Thereafter the produced foil is scrutinized on a light table and the inclusions are evaluated.

According to the foil test method described above the recycled material according to the invention in a foil with a thickness of 0.03 up to 0.04 mm shows in an area of 30 mm diameter no visible inclusions caused by varnish particles being bigger than 0.025 $mm^2$. The recycled material is judged good generally if no more than 3 probes out of 5 produced according to the foil test procedure mentioned above show inclusions between 0.1–0.25 $mm^2$ and no probe shows inclusions being bigger than 0.25 $mm^2$. These standards were met in all tests.

Referring to the accompanying drawing in the following an embodiment of the inventive method for producing a recycled plastic material is described.

The only Figure shows in form of a flow chart the inventive method steps. (FIG. 1).

Varnished plastic parts 1 with all foreign parts mounted thereto, are fed to a preshredder A, e.g. mountings, lamps, etc.. In the preshredder the plastic parts are crushed to pieces the size of palms by means of antirotating cutting knives. The precrushed or preshredded chips undergo a first coarse separation in a sink-float-device B. Due to the difference in density the chips are divided by means of added water into a sinking and a floating fraction. The sinking fraction 5 consisting essentially of metals is removed and processed elsewhere. The floating fraction 6 consisting preferably of plastic containing materials is removed e.g. by means of a conveyer worm and conveyed to a coarse wet mill C. The chips having the size of palms are milled to a ground stock 8 having a grain size of approximately 6 up to 8 mm, whereby water 7 is added. Simultaneously further impurities, labels etc. 9 are removed in the coarse wet mill and the wet milling causes advantageously a cooling effect and contributes to reducing dust evolution. Parts 8 of the melt stock can automatively reconveyed to the coarse wet mill C to remill certain parts of the mill or ground stock if not meeting precise standards, for example after screening. The moist material flow 8 coming from the coarse wet mill C is conveyed to the centrifugal dryer D and after being dried ground stock 11 is fed to hydro cyclone E for a further separation. The ground stock material is swirled in water and separated by its density. All materials with densities>1, e.g. polyamides, ABS-plastics etc. are rejected whereas all materials with a density<1 belong to a fraction 13 which is conveyed to a mechanical dryer F. After the drying process in the mechanical dryer F the stock of fraction 14 is wet milled in an impact disc mill G in a defibrating manner. Water 15 is added to the process. The impact disc mill G is a disintegration apparatus with a conical housing having a rotating spinner gate comprising radial situated ridges between two impact discs. One of the impact discs is rotating counterwise to the spinner gate while the other impact disc is fixed. The stock to be milled is fed through the fixed impact disc, is disintegrated between the spinner gate and the impact disc and then discharged through a gap between the two impact discs on the periphery. The resulting fraction 16 having an average fiber length between 1 up to 3 mm and a fiber diameter of approximately 0.1 mm is thereafter screened using a vibrating screen H. The varnish flaked off in the impact disc mill G is screened out using the fibrating screen H and removed 17. The pulverized or milled material 18 free of varnish is fed to a vacuum granulate extruder R for further processing so that a recycled material in form of a granulate 19 is obtained having preferably only very low losses in quality caused by very low contents of old varnish particles.

Further embodiments and advantageous of the method according to the invention can be gathered from the following claims.

I claim:

1. A method for recycling and reclamation of plastic materials from varnished plastic parts comprising the following steps:

(a) coarse disintegration of the varnished plastic parts in a first shredder to produce coarse particles, (b) fine milling of said coarse particles and simultaneously inducing stretch and shear forces in the particles, the stretch and shear forces causing bending and stretching of the particles so that adherent varnish flakes are removed to produce plastic particles and varnish particles, and (c) separation of said plastic and varnish particles.

2. The method according to claim 1 wherein the coarse particles are fine milled by a defibrating means.

3. The method according to claim 2 wherein said fine milling of the coarse particles results in plastic particles having the shape of a fiber material having an average fiber dimension with a length from 0.5 mm to 6 mm and a diameter of 0.005 up to 0.5 mm.

4. The method according to claim 3 wherein the fine milled particles having the shape of a plastic fiber material are removed by a sieve means after the first passage through the milling apparatus and the remaining material differing from the desired size is recycled to the milling apparatus.

5. The method according to claim 3 wherein the resulting fine milled plastic fibers and varnished particles are separated using a vibrating screen.

6. The method according to claim 3 wherein the resulting fine milled plastic fibers and varnished particles are separated by a classification by air in a cyclone.

7. The method according to claim 3 wherein the resulting plastic fibers and varnish particles are separated in a sink-float-device or in a hydro cyclone.

8. The method according to claim 1 wherein an apparatus is used for the fine milling of the coarse particles having a gap between a rotating and a fixed milling disc being designed to produce sufficient shear forces, whereby the particles are bent when passing the gap and the varnished particles adherent on the plastic particles are caused to flake.

9. The method according to claim 4, wherein the coarse particles pass through tapering gap between two milling discs having a sawtooth profile while being defibrated.

10. The method according to claim 8 wherein the milling apparatus for carrying out the fine milling is an impact mill or an impact disc mill.

11. The method according to claim 8 wherein the fine milling is carried out under wet conditions.

12. The method according to claim 1 wherein the varnished plastic parts together with metallic parts mounted thereto are shredded, before the coarse disintegration, to chips and that the resulting shredded fraction is separated to exclude the existing metallic fraction.

13. The method according to claim 1 wherein the varnished plastic parts are disintegrated into particles having an average size from 4 to 12 mm.

14. The method according to claim 13 wherein the varnished plastic parts are disintegrated to coarse particles by a cutting means.

15. The method according to claim 14 wherein the cutting means is a cutting mill and the disintegration is carried out under wet conditions resulting in a material flow and a waste flow.

16. The method according to claim 15 wherein the coarse particles coming from the material flow are separated in a hydro cyclone according to their density, whereby all sinking materials with a density of <1 are removed.

17. The method according to claim 1 wherein the varnish particles comprise at least one member selected from the group consisting of polyurethane and acrylate.

* * * * *

UNITED STATES PATENT AND TRADEMARK OFFICE
CERTIFICATE OF CORRECTION

PATENT NO. : 5,566,889
DATED : October 22, 1996
INVENTOR(S) : Joachim Preiss

It is certified that error appears in the above-indentified patent and that said Letters Patent is hereby corrected as shown below:

col. 10, line 11, change "<1" to -->1--.

Signed and Sealed this

Tenth Day of February, 1998

*Attest:*

BRUCE LEHMAN

*Attesting Officer*     *Commissioner of Patents and Trademarks*